(12) United States Patent
Isozu

(10) Patent No.: US 8,495,495 B2
(45) Date of Patent: Jul. 23, 2013

(54) INFORMATION PROCESSING APPARATUS, BOOKMARK SETTING METHOD, AND PROGRAM

(75) Inventor: Masaaki Isozu, Tokyo (JP)

(73) Assignee: Sony Corporation, Tokyo (JP)

( * ) Notice: Subject to any disclaimer, the term of this patent is extended or adjusted under 35 U.S.C. 154(b) by 157 days.

(21) Appl. No.: 12/945,970

(22) Filed: Nov. 15, 2010

(65) Prior Publication Data
US 2011/0126105 A1      May 26, 2011

(30) Foreign Application Priority Data

Nov. 20, 2009    (JP) ................................ 2009-264820

(51) Int. Cl.
*G06F 3/00*        (2006.01)
*G06F 17/00*       (2006.01)
(52) U.S. Cl.
USPC ............ 715/720; 715/721; 715/723; 715/230
(58) Field of Classification Search
USPC .................. 715/230, 232, 233, 719, 720, 721
See application file for complete search history.

(56) References Cited

U.S. PATENT DOCUMENTS

| | | | |
|---|---|---|---|
| 2004/0021685 A1 | 2/2004 | Denoue et al. | |
| 2004/0205482 A1 | 10/2004 | Basu et al. | |
| 2005/0229227 A1 | 10/2005 | Rogers | |
| 2005/0289452 A1* | 12/2005 | Kashi et al. ................. | 715/512 |
| 2008/0046925 A1 | 2/2008 | Lee et al. | |
| 2009/0138906 A1 | 5/2009 | Eide et al. | |
| 2009/0210779 A1 | 8/2009 | Badoiu et al. | |
| 2009/0249185 A1* | 10/2009 | Datar et al. ................. | 715/230 |

FOREIGN PATENT DOCUMENTS

| | | |
|---|---|---|
| EP | 1 669 997 | 6/2006 |
| JP | 2008-078997 | 4/2008 |

* cited by examiner

*Primary Examiner* — Haoshian Shih
(74) *Attorney, Agent, or Firm* — Wolf, Greenfield & Sacks, P.C.

(57) ABSTRACT

There is provided an information processing apparatus including a content display unit for displaying movie content on a display screen, and a bookmark setting unit for setting a bookmark in which a display position where a display subject is displayed on the display screen and a temporal position within the movie content where the display subject is displayed on the display screen are mutually related to each other, to the display subject of the movie content displayed on the display screen by the content display unit.

14 Claims, 13 Drawing Sheets

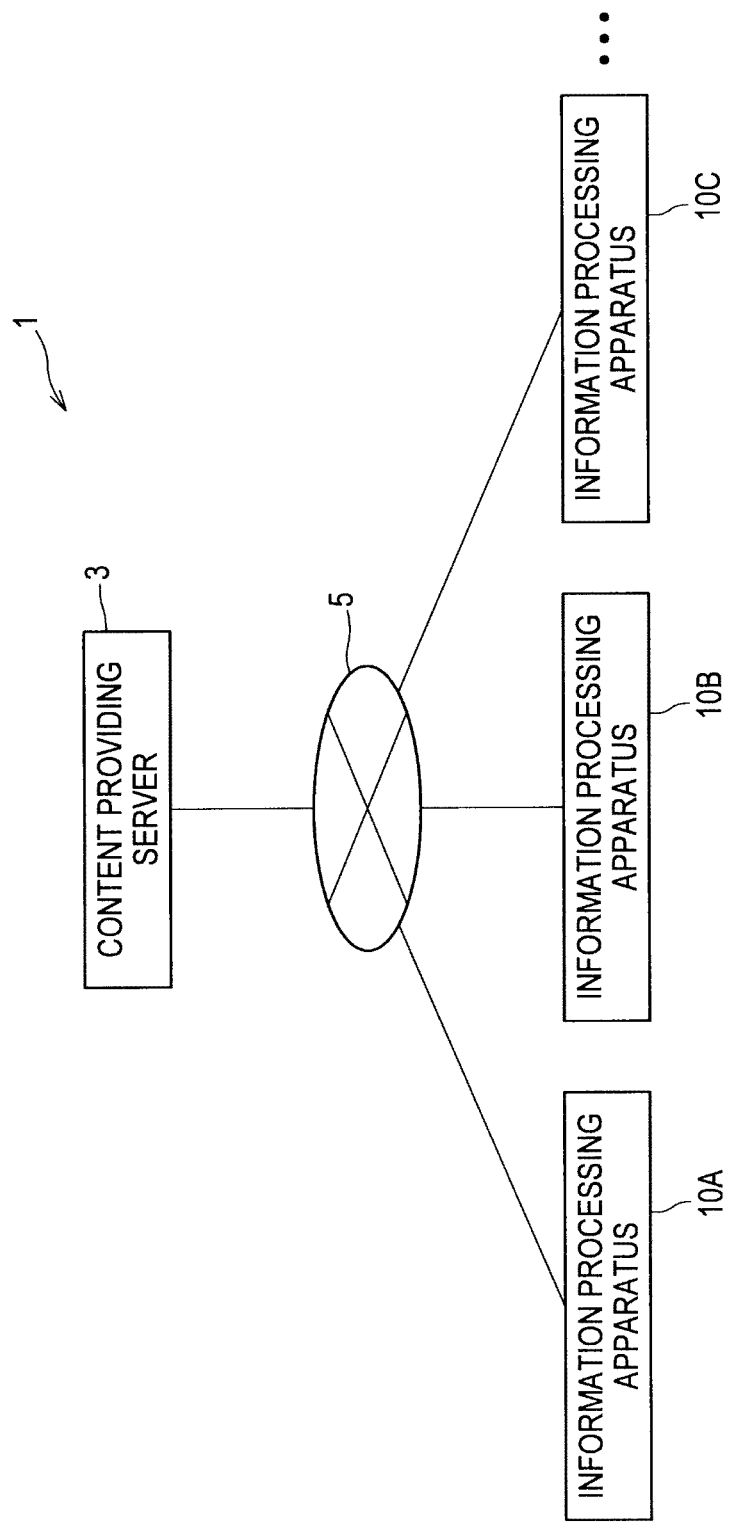

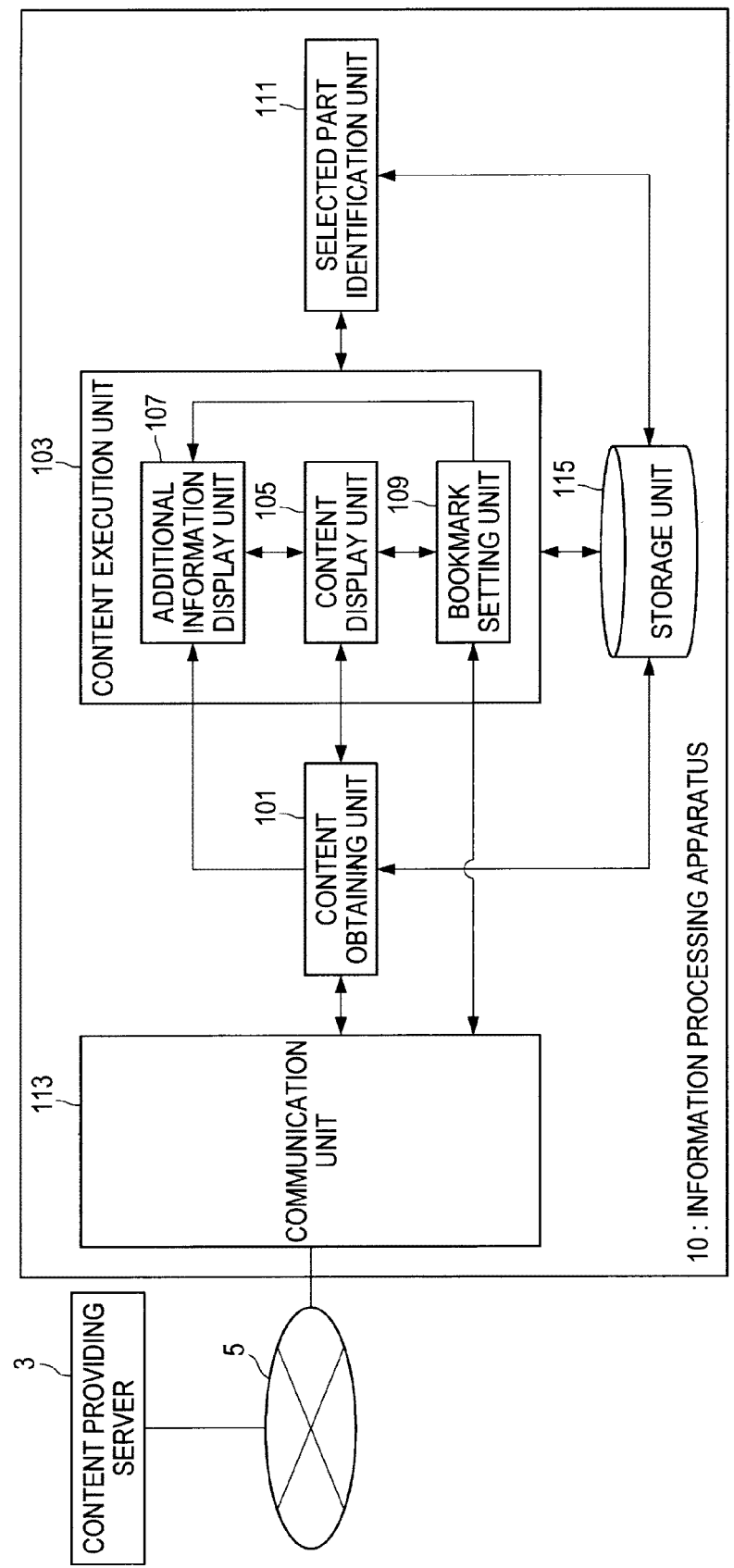

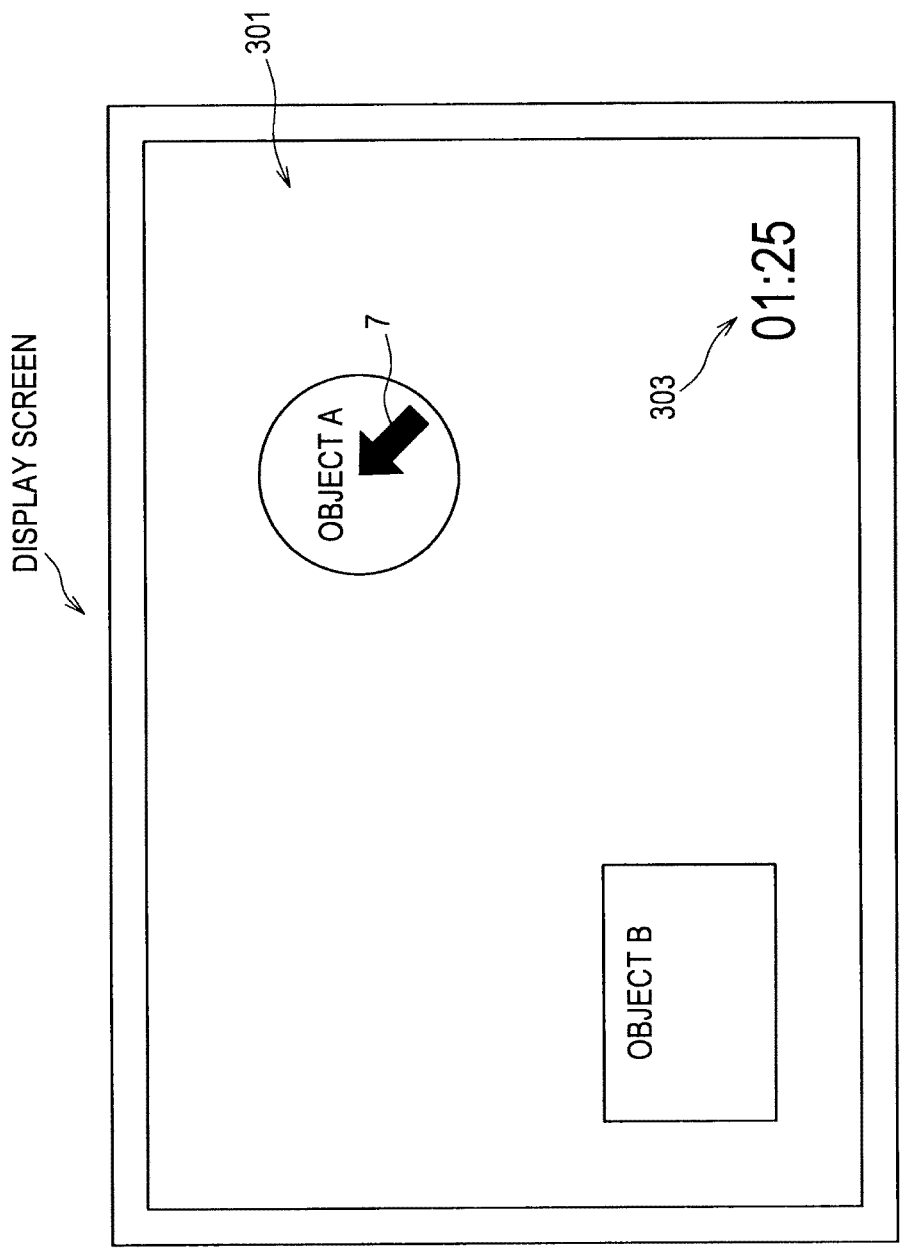

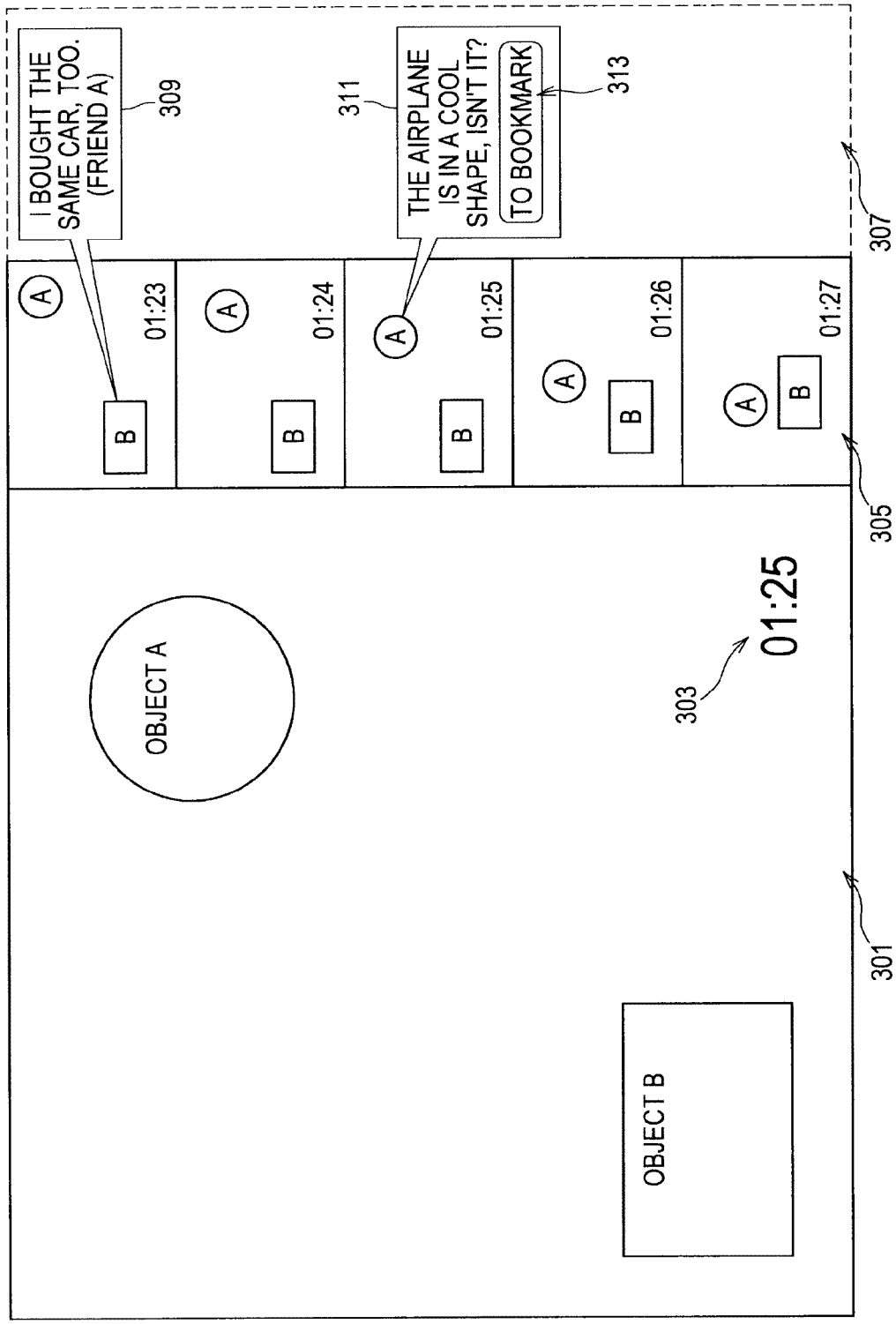

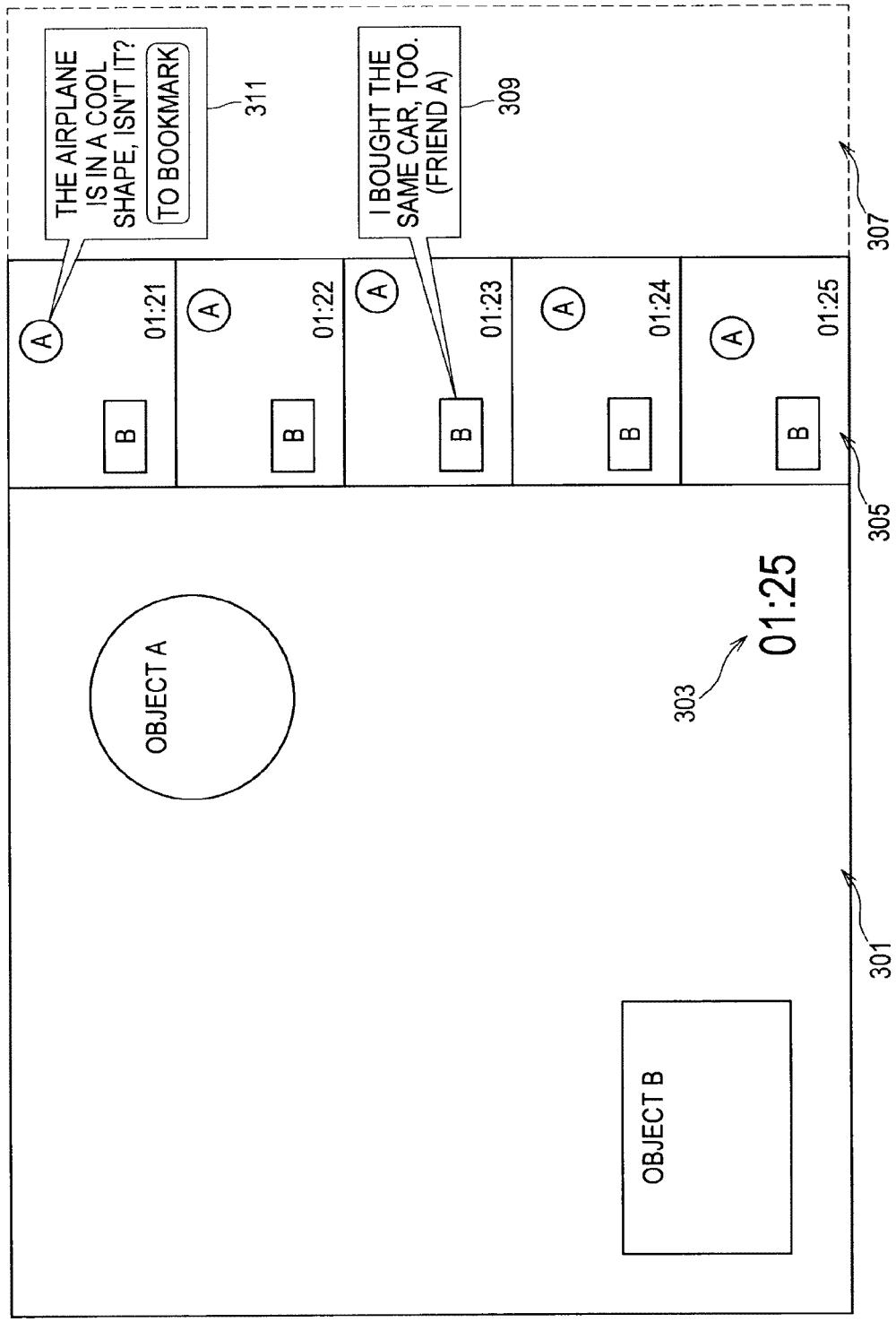

FIG.5A

<Request Message>
Content ID = 200901011234
Elapsed = " 01 : 25 "
Point = [ 200 , 100 ]

FIG.5B

<Request Message>
Content ID = 200901011234
Elapsed = " 01 : 25 "
Point = [ 200 , 100 ]
Thumbnails = 0123.png, 0124.png,
0125.png, 0126.png, 0127.png
Comments = 01 : 23, " I BOUGHT THE
SAME CAR, TOO. (FRIEND A) ", [ 50, 300 ]

FIG.6

| CONTENT ID | TIME | POINT | THUMBNAIL IMAGE | USER ID | COMMENT |
|---|---|---|---|---|---|
| c001 | 01:23 | (100, 200) | c001-0123-tb.jpg | FRIEND A | I BOUGHT THE SAME CAR, TOO. |
| c001 | 01:23 | (100, 200) | c001-0123-tb.jpg | FRIEND B | IT GETS BETTER AFTER THE MODEL CHANGED. |
| c001 | 01:25 | (500, 100) | c001-0125-tb.jpg | FRIEND B | THE AIRPLANE IS IN A COOL SHAPE, ISN'T IT? |
| c001 | 01:25 | (500, 100) | c001-0125-tb.jpg | FRIEND C | THE SKY IS BEAUTIFUL. |
| ... | ... | ... | ... | ... | ... |

INFORMATION PROCESSING APPARATUS, BOOKMARK SETTING METHOD, AND PROGRAM

BACKGROUND OF THE INVENTION

1. Field of the Invention

The present invention relates to an information processing apparatus, a bookmark setting method, and a program.

2. Description of the Related Art

The spread of movie sites providing movie content makes more links described in a web site such as blog having a destination of movie content. Since it has also been general to embed the content of the movie sites directly into the web site, it is now easy to introduce interesting movie content to others.

Thus, since viewing video content in a web site becomes popular, there have been more cases of using a function to set a bookmark such as a comment onto movie content (for example, refer to the Japanese Unexamined Patent Application Publication No. 2008-78997). By using such a function, it can realize a social bookmark function which is a function to share a bookmark set by a certain viewer on movie content with a lot of viewers.

SUMMARY OF THE INVENTION

However, even though a certain viewer finds an interesting scene, and bookmarks a movie of the scene to notify his/her friend, it is not easy for the friend to find the interesting scene using the same bookmark. This is because the bookmark on the movie content is for bookmarking the movie content itself, not for the scene in the movie content.

Moreover, even though the viewer gets interested in an object displayed in the movie (for example, a display subject such as a character, an animal, and an item), a bookmark have been set only to the whole movie content, but not to a specific object.

In light of the foregoing, it is desirable to provide a novel and improved an information processing apparatus, a bookmark setting method and a program which are capable of easily setting a bookmark to a display subject of movie content itself.

According to an embodiment of the present invention, there is provided an information processing apparatus including a content display unit for displaying movie content on a display screen, and a bookmark setting unit for setting a bookmark in which a display position where a display subject is displayed on the display screen and a temporal position within the movie content where the display subject is displayed on the display screen are mutually related to each other, to the display subject of the movie content displayed on the display screen by the content display unit.

The bookmark may further include an arbitrary comment to the display subject specified by a user operation.

The information processing apparatus may further include an additional information display unit for displaying additional information including the bookmark that has been already related to the movie content. The additional information display unit may display a certain number of pieces of thumbnail images in a prescribed area within the display screen if the display subject displayed on the display screen is selected by a user operation.

The additional information display unit may refer to the temporal position of the selected display subject and may display the thumbnail image at the temporal position and another thumbnail image temporally positioned adjacent to the thumbnail image.

The additional information display unit may display a thumbnail image corresponding to the temporal position that has been already set with the bookmark within the prescribed area.

The bookmark setting unit may relate a display position of the display subject on the thumbnail image displayed on the prescribed area selected by a user operation and a temporal position of the thumbnail image to each other to set as a bookmark.

The information processing apparatus may further include a selected position specifying unit for specifying a position of a user operation performed to the display screen, and the selected position specifying unit may specifiy a relative coordinate indicating a position selected by a user operation in accordance with a size of the display screen, and specifies a temporal position in the movie content of the display subject based on a temporal position related to image data that configures the movie content and that includes a selected display subject.

The information processing apparatus may further include a communication unit for transmitting the bookmark set by the bookmark setting unit to a device externally equipped.

According to another embodiment of the present invention, there is provided a bookmark setting method including the steps of displaying video content on a display screen, specifying, based on a user operation performed to a display subject of the movie content displayed on the display screen, a display position where the display subject is displayed on the display screen and a temporal position within the movie content where the display subject is displayed on the display screen, and relating the specified display position and temporal position to each other to set a bookmark to the display subject.

According to another embodiment of the present invention, there is provided a program causing a computer to function as displaying movie content on a display screen, and setting a bookmark in which a display position where a display subject is displayed on the display screen and a temporal position within the movie content where the display subject is displayed on the display screen are mutually related to each other and are set as a bookmark to the display subject of the movie content displayed on the display screen by the content display unit.

As described above, according to the present invention, it is possible to easily bookmark a display subject itself of movie content.

BRIEF DESCRIPTION OF THE DRAWINGS

FIG. 1 is an explanatory diagram for illustrating a content viewing system according to a first embodiment of the present invention;

FIG. 2 is a block diagram for illustrating a configuration of an information processing apparatus according to the embodiment;

FIG. 3A is an explanatory diagram for illustrating a display screen displayed in the information processing apparatus according to the embodiment;

FIG. 3B is an explanatory diagram for illustrating a display screen displayed in the information processing apparatus according to the embodiment;

FIG. 3C is an explanatory diagram for illustrating a display screen displayed in the information processing apparatus according to the embodiment;

FIG. 5A is an explanatory diagram for illustrating an example of information transmitted from the information processing apparatus according to the embodiment;

FIG. 5B is an explanatory diagram for illustrating an example of information received by the information processing apparatus according to the embodiment;

FIG. 6 is an explanatory diagram for illustrating a bookmark inserted into content;

DETAILED DESCRIPTION OF THE EMBODIMENT(S)

Figure 4:
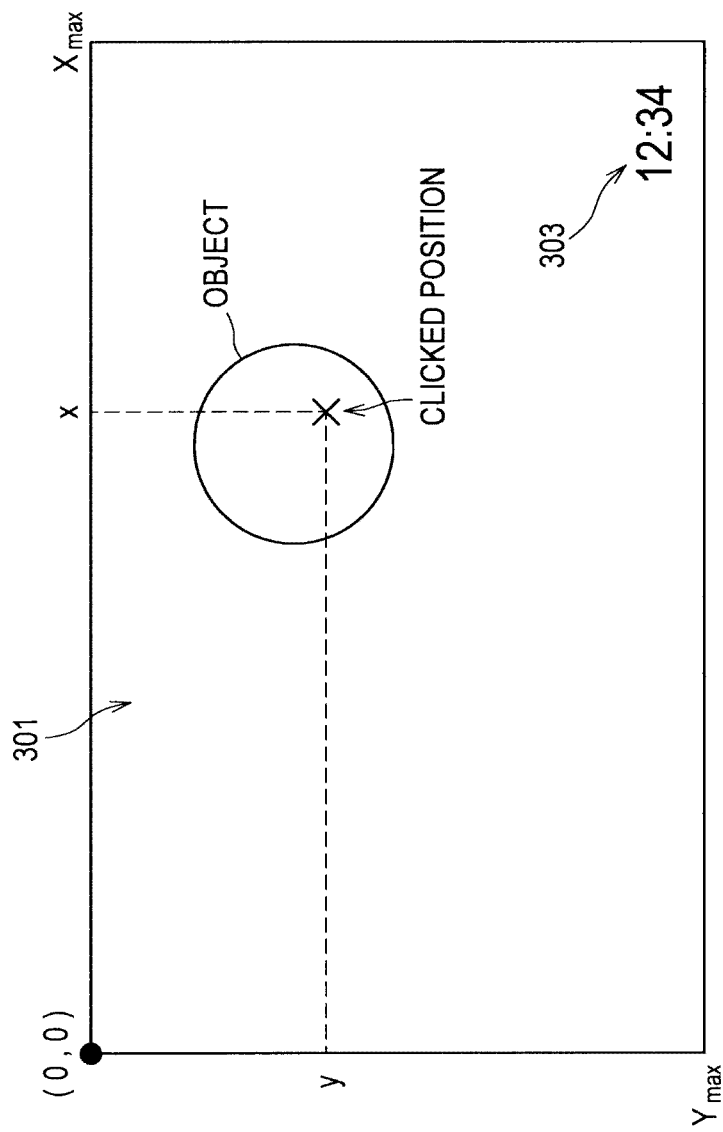
FIG. 4 is an explanatory diagram for illustrating a method to specify a selected part.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be described hereinafter in the following order:

(1) First Embodiment
  (1-1) Content viewing system
  (1-2) Configuration of the information processing apparatus
  (1-3) Bookmark setting method
  (1-4) Modified examples
(2) Hardware configuration of the information processing apparatus according to the embodiment of the present invention
(3) Summary

(1) First Embodiment

<Content Viewing System>

First, referring to FIG. 1, a detail explanation will be given on a content viewing system according to a first embodiment of the present invention. FIG. 1 is an explanatory diagram for illustrating a content viewing system according to the first embodiment.

An information processing system 1 according to the present embodiment include, as shown in FIG. 1 for example, a content management server 3 and information processing apparatuses 10A, 10B, 10C, and so on (hereinafter, simply abbreviated as information processing apparatus 10). The content management server 3 and the information processing apparatus 10 are connected to a communication network 5 as shown in FIG. 1. The content management server 3 and the information processing apparatus 10 can transmit/receive various types of information to/from each other via the communication network 5.

The content providing server 3 is a server which manages movie content such as motion picture, and various types of information related to the movie content. The content providing server 3 provides the content itself that is managed thereby, metadata of the content, and additional information such as bookmarks or comments or the like attached to the content, to the information processing apparatus 10, in response to a request from the information processing apparatus 10.

The communication network 5 is a communication line network which connects the content providing server 3 with the information processing apparatus 10 and allows two-way communication therebetween. The communication network includes, for example, a public line network such as the Internet, a telephone line network, a satellite communication network, and a broadcast communication channel, and a leased line network such as a WAN (Wide Area Network), a LAN (Local Area Network), an IP-VPN (Internet Protocol-Virtual Private Network), an Ethernet (registered trademark), and a wireless LAN, and may be wired or wireless. That is, a content viewing system 1 according to the present embodiment may be a part of a public service using a public line network such as the Internet, or may be a private system which is not disclosed to a third party who utilizes a home network such as a LAN.

The information processing apparatus 10 is a device which is capable of communicating with the content providing server 3 via the communication network 5. The information processing apparatus 10 requests the content providing server 3 to disclose movie content and various information related to the movie content, and obtains the content and the various information from the content providing server 3. Moreover, the information processing apparatus 10 can set a bookmark including a comment or the like to the movie content. If the movie content is obtained from the content providing server 3, the information processing apparatus 10 transmits information related to the bookmark that is set, to the content providing server 3 for managing it so as to share the bookmark that is set with another user.

The information processing apparatus 10 may be any as long as it is a device having a communication function using a network, and examples of the device include various types of computer devices, television receivers, DVD/HDD/Blu-ray recorders, mobile phones, PDA's, and digital cameras. Further, the information processing apparatus 10 may also be a home information appliance such as a home video game machine or a digital video camera, a television broadcast tuner or decoder, or the like. Further, the information processing apparatus 10 may also be a portable device such as a portable game machine, a PHS, a portable video/audio player or the like.

Further, although the information processing apparatus 10 is connected to the content providing server 3 via the communication network 5 in FIG. 1, the information processing apparatus 10 may be directly connected to the content providing server 3 not via the communication network 5.

Further, although the number of the content providing servers 3 connected to the communication network 5 is one in FIG. 1, the present embodiment is not limited to the case described above, and two or more content management servers 3 may be connected to the communication network 5. In the same manner, although the number of the information processing apparatuses 10 connected to the communication network 5 is three in FIG. 1, the present embodiment is not limited to the case described above, and the number of the information processing apparatuses 10 connected to the communication network 5 may be one, or four or more.

FIG. 1 illustrates the content providing server 3 and the information processing apparatus 10 are different devices, however, the content providing server 3 may have functions of the information processing apparatus 10, and the information processing apparatus 10 may have functions of the content providing server 3.

<Configuration of the Information Processing Apparatus>

Subsequently, with reference to FIG. 2, a configuration of an information processing apparatus according to the present embodiment will be described in detail. FIG. 2 is a block diagram illustrating a configuration of the information processing apparatus according to the present embodiment.

The information processing apparatus 10 according to the embodiment is a device capable of freely setting a bookmark including a comment to a display subject (an object) itself that is displayed on a display screen as a movie content. The information processing apparatus 10 mainly includes, as shown in FIG. 2 for example, a content obtaining unit 101, a content execution unit 103, a selected part identification unit 111, a communication unit 113, and a storage unit 115.

The content obtaining unit 101 is realized, for example, by a CPU (Central Processing Unit), a ROM (Read Only Memory), a RAM (Random Access Memory), or the like. The content obtaining unit 101 obtains content data corresponding to movie content and additional information associated to the content data from the content providing server 3 via the later-described communication unit 113. As an example of the additional information associated to the content data is, for example, metadata including information or the like related to thumbnail image in each scene of movie content, and information related to a bookmark including a comment added by a viewer.

The content obtaining unit 101 transmits the obtained content data and additional information to the later-described content execution unit 103. Moreover, the content obtaining unit 101 may store such obtained information onto the later-described storage unit 115.

The content execution unit 103 is realized, for example, by a CPU, a ROM, a RAM, or the like. The content execution unit 103 is a processing unit for performing the obtained content data of movie content or the like and for displaying the movie content on a display screen (not shown) which the information processing apparatus 10 according to the embodiment has. Moreover, the content execution unit 103 can set a bookmark including a comment to a display subject itself contained in movie content. The content execution unit 103 further includes, as shown in FIG. 1 for example, a content display unit 105, an additional information display unit 107, and a bookmark setting unit 109.

The content display unit 105 is realized, for example, by a CPU, a ROM, a RAM or the like. The content display unit 105 reproduces movie content using the content data that the content obtaining unit 101 has obtained, and displays the subject of movie content in a prescribed display area on the display screen attached to a display unit (not shown). If the content data is a coded data, the content display unit 105 decodes the coded data and reproduces the movie content. At this time, the content display unit 105 may reproduces the movie content while decoding the content data, and may reproduces the movie content after the decoding of the content data is completed.

The additional information display unit 107 may be realized, for example, by a CPU, a ROM, a RAM or the like. The additional information display unit 107 refers to the additional information transmitted from the content obtaining unit 101, and displays a plurality of thumbnail images including thumbnail image corresponding to a scene of the movie content that is currently displayed onto a prescribed display area of the display screen. Note that displaying the thumbnail image is performed when the later-described selected part identification unit 111 notifies that a display area that is currently displaying movie content has been selected by user operation. Moreover, if a bookmark has been already set by a viewer to the scene corresponding to the displayed thumbnail image, the additional information display unit 107 displays the bookmark that has been already set along with the thumbnail image.

Further, the thumbnail image displayed in the prescribed display area by the additional information display unit 107 can be operated separately from the movie content itself currently displayed by the content display unit 105. For example, even though the content subject of the movie content currently displayed by the content display unit 105 has changed with time, the plurality of thumbnail images displayed by the additional information display unit 107 may not associated with the display subject of the movie content that has been changed with time.

Further, the display area on which the additional information display unit 107 displays additional information in the display screen, may be an area that has already been set in the display screen, or may be an area that is generated in the display screen when displaying the additional information.

The bookmark setting unit 109 is realized, for example, by a CPU, a ROM, a RAM or the like. The bookmark setting unit 109 is a processing unit which sets a bookmark including a comment configured by text data, to an arbitrary display subject itself at an arbitrary time frame in movie content. Therefore, in this bookmark, a display position (a position in the display screen) where the display content is displayed in the display screen and a temporal position (a display timing) in movie content where the display subject is displayed in the display screen are mutually related to each other. A setting processing of such bookmark is started when the later-described selected part identification unit 111 notifies that the display area displaying movie content is selected by a user operation.

The bookmark setting unit 109 determines the display position and the temporal position of the display subject where to set a bookmark, based on a result of user selection of the display subject of the movie content that the content display unit 105 is displaying. Moreover, the bookmark setting unit 109 is also capable of determining the display position and the temporal position of the display subject where to set a bookmark, based on a result of user selection of thumbnail image that the additional information display unit 107 is displaying.

When determined the display position and the temporal position of the display subject where to set a bookmark, the bookmark setting unit 109 associates these information to each other and generates bookmark information related to a bookmark. Moreover in this bookmark information, a user can add arbitrarily add a comment to the display subject set with a bookmark. The comment is preferably in a text format, but may be image data, such as static image or the like, as a comment. Further, since a text format can be used for comments, the user can set a comment using a language like HTML, for example. This enables the user to freely set an arbitrary comment onto the display subject itself of the move content.

To share the set bookmark with a device externally equipped (for example, the content providing server 3 or other information processing apparatuses 10) to the information processing apparatus 10, the bookmark setting unit 109 may transmits the set bookmark externally via the later-described communication unit 113.

Heretofore, the content execution unit 103 according to the present embodiment has been explained.

Note that each processing performed by the content execution unit 103 will be explained in more detail with specific examples hereinafter.

Subsequently, the selected part identification unit 111 according to the embodiment will be explained.

The selected part identification unit 111 is realized, for example, by a CPU, a ROM, a RAM, an input device or the like. The selected part identification unit 111 is a processing unit which specifies a position of a selected part when a user has selected an arbitrary part in the display screen by operating the input device equipped to the information processing apparatus 10.

For example, here is a case where a mouse is equipped as an input device of the information processing apparatus 10. The selected part identification unit 111 focuses on which position in the display screen a position specifying object such as a mouse pointer that moves in response to a mouse operation is located, and specifies a part of the display screen selected by user operation. Further, there is another case where a click operation or the like has selected a certain part of the display screen where movie content is reproducing by user operation. At this time, the selected part identification unit 111 inquires to the content display unit 105 about a temporal position of movie content that was displayed when a click operation has been performed (for example, an elapsed time from the beginning of the content). This enables the selected part identification unit 111 to acquire the temporal position and the display position of the display subject when the arbitrary display subject of movie content is selected.

On the other hand, here is another case where a touch panel is equipped as an input device of the information processing apparatus 10. In this case, the selected part identification unit 111 focuses on whether an operation tool, such as a user's finger or a stylus or the like, comes into proximity or touches the touch panel, and specifies the part of the display screen selected by user operation. Further, there is another case where a certain part of a display screen is selected by an operation tool coming into proximity or touching the part of the display screen where movie content is reproducing. At this time, the selected part identification unit 111 inquires to the content display unit 105 about a temporal position of movie content that was displayed when the operation tool has come into proximity or touched (for example, an elapsed time from the beginning of the content). This enables the selected part identification unit 111 to acquire the temporal position and the display position of the display subject when the arbitrary display subject of movie content is selected.

Further, the selected part identification unit 111 is also capable of specifying a direction in which a user operation is performed by focusing on a temporal elapse of the selected position that has been specified.

Thus, the selected part identification unit 111 specifies the display position of the display subject where the user operation has been performed and the temporal position in the movie content or the like, and notifies each processing units included in the content execution unit 103 and the content execution unit 103 of the specified subject.

The communication unit 113 is realized, for example, by a CPU, a ROM, a RAM, a communication device or the like. The communication unit 113 is a processing unit that controls communications between the information processing apparatus 10 according to the present embodiment and another device that is externally equipped to the information processing apparatus 10 (for example, the content providing server 3 or other information processing apparatuses 10). The other device to be other party of communication may be a device that is connected to with the information processing apparatus 10 via local area network, or may be a device that is connected to a public network such as internet or the like. The communication control in the communication unit 113 performs based on a prescribed protocol that has been set with the device to be the other party of the communication.

The communication unit 113 is capable of transmitting information related to a bookmark set by the content execution unit 103 (more specifically, by the bookmark setting unit 109) to a device externally equipped (for example, the content providing server 3 or other information processing apparatuses 10). This enables the content providing server 3 or other information processing apparatuses 10 to share the bookmark that is set by the information processing apparatus 10.

The storage unit 115 is an example of the storage device included in the information processing apparatus 10 according to the present embodiment. The storage unit 115 arbitrarily stores various parameters which became necessary to be saved at the time when the information processing apparatus 10 performed certain processing, the progress history of the processing, or various types of databases, or the like. The storage unit 115 can be freely read and written by each processing unit of the information processing apparatus 10 according to the present embodiment.

Heretofore, an example of the functions of the information processing apparatus 10 according to the present embodiment has been shown. Each of the structural elements described above may be configured using a general-purpose material or a general-purpose circuit, or may be configured from hardware dedicated to the function of each structural element. Also, a CPU or the like may perform all the functions of the structural elements. Accordingly, the configuration to be used can be changed as appropriate according to the technical level at the time of carrying out the present embodiment.

Additionally, a computer program for realizing each function of the information processing apparatus 10 according to the present embodiment as described above can be created, and the computer program can be implemented in a personal computer or the like. A recording medium in which such computer program is stored and which can be read by a computer can also be provided. The recording medium is a magnetic disk, an optical disk, a magneto-optical disk, a flash memory, or the like, for example. Also, the computer program may be distributed via a network, for example, without using a recording medium.

<Bookmark Setting Method>

Figure 7:
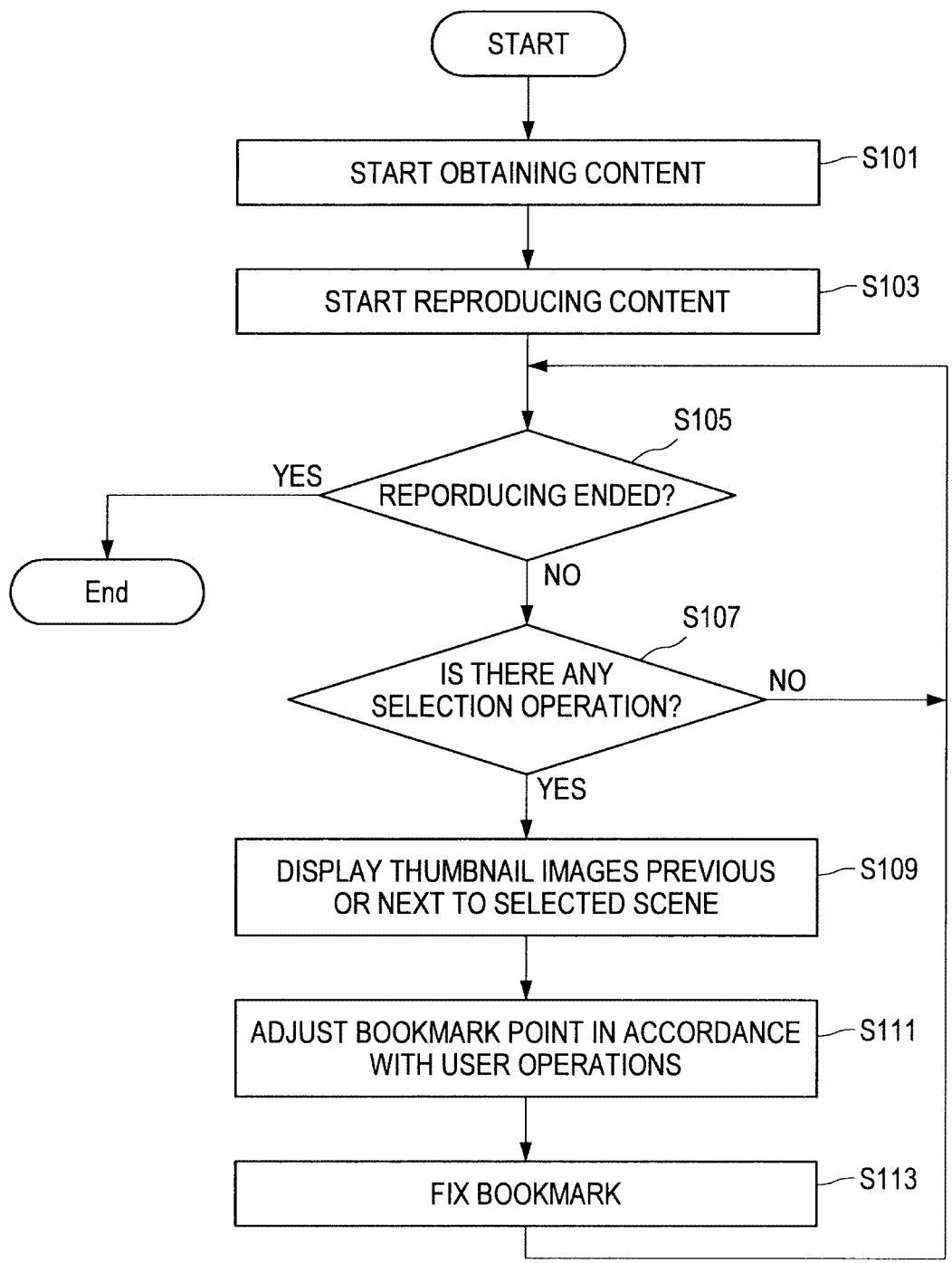
FIG. 7 is a flow chart for illustrating a bookmark setting method according to the embodiment.
Figure 8:
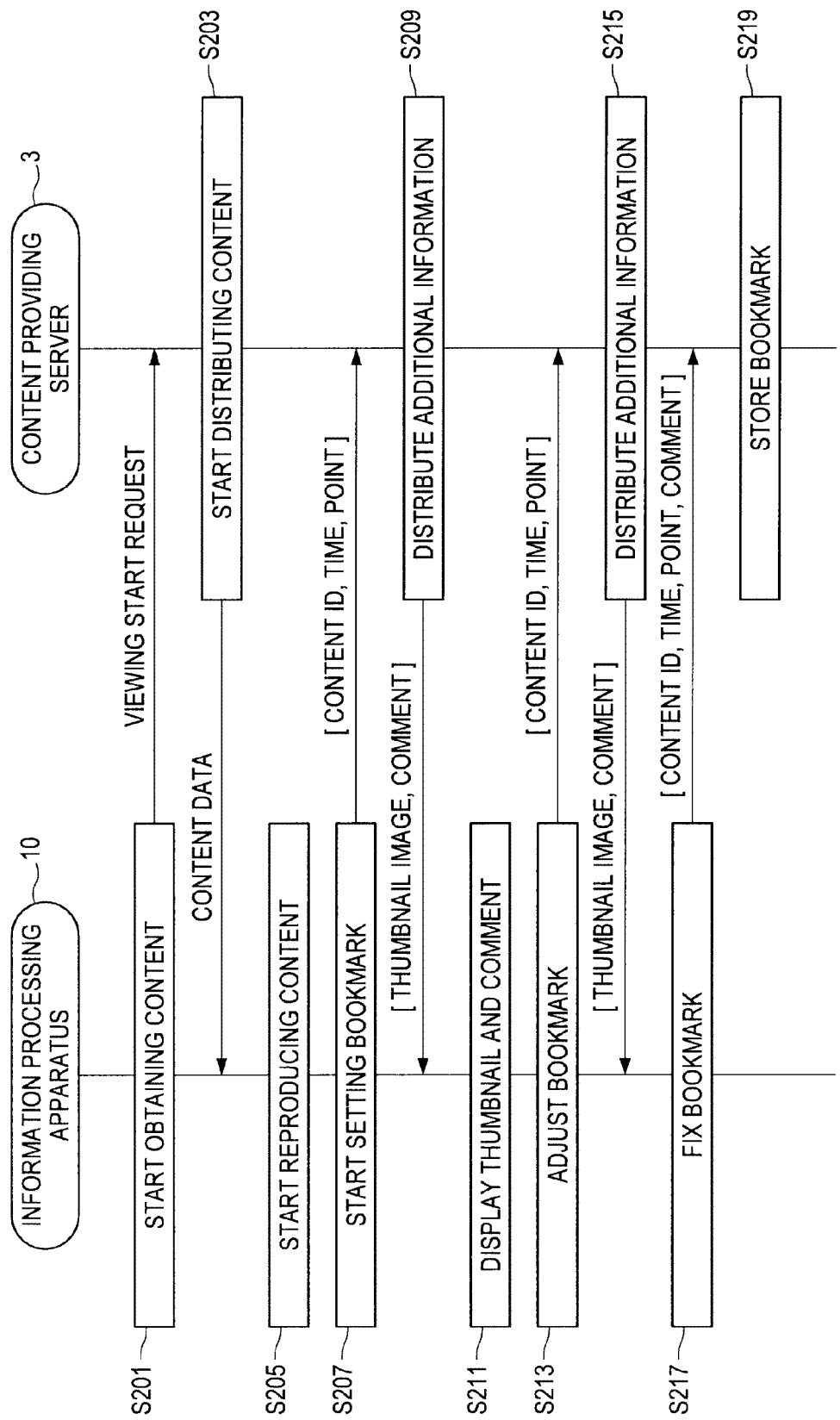
FIG. 8 is a flow chart for illustrating a bookmark setting method according to the embodiment.

Subsequently, referring to FIG. 3A to FIG. 8, the bookmark setting method according to the embodiment will be described in more detail. FIG. 3A to 3C are explanatory diagrams for illustrating a display screen displayed in the information processing apparatus according to the embodiment. FIG. 4 is an explanatory diagram for illustrating a method to specify a selected portion. FIGS. 5A and 5B are explanatory diagrams for illustrating an example of information transmitted from the information processing apparatus according to the embodiment. FIG. 6 is an explanatory diagram for illustrating a bookmark inserted into content. FIGS. 7 and 8 are flow charts for illustrating a bookmark setting method according to the embodiment.

[Specific Examples for Bookmark Setting Method]

Firstly, referring to FIG. 3A to FIG. 6, the bookmark setting method will be described in more detail.

If the content obtaining unit 101 obtains content data of certain movie content from the content providing server 3, the content obtaining unit 101 transmits the obtained content data to the content execution unit 103. The content display unit 105 of the content execution unit 103 performs the obtained content data, generates a content display area 301, like the one shown in FIG. 3A, on the display screen, and starts reproducing the movie content. The content display area 301 is an area, as shown in FIG. 3A, where the subject of movie content is displayed, and information 303 indicating the elapsed time from the beginning of the movie content that is currently reproduced within the content display area 301.

Here is a case where at a certain moment (for example, at 1 min 25 sec elapsed time, shown in FIG. 3A), a user operates an input device such as a mouse or the like to move a position specifying object 7 such as a mouse pointer or the like. It is assumed that at this time two kinds of objects (an object A and an object B) are displayed as a display subject of movie content in the content display area 301. The object A and the object B are arbitrary objects described in a plurality of images that configure movie content, and in the following explanation, for convenience sake, it is assumed that both of the objects are objects that move: the object A is an airplane, and the object B is a car.

It is supposed that the user operates such as a mouse or the like to move the position specifying object 7 to a place of the object A, and performs a click operation over the object A. At this time the selected part identification unit 111 specifies the display position of the display screen where the click operation was operated, and while specifying that, inquires an elapsed time of the content at a time of the click operation to the content display unit 105. When inquiring to the content display unit 105, the selected part identification unit 111 notifies that the user operation has selected the display subject. This enables the bookmark setting unit 109 of the content execution unit 103 starts a bookmark setting processing.

Firstly, an explanation will be given on a specifying processing of the display position.

In the content display area 301, as shown in FIG. 4 for example, there may be two coordinate axes that are at right angles to each other. It is assumed for convenience sake that the left upper corner is an original point in the content display area 301, and that a width direction of the content display area 301 is x-axis direction and a height direction is y-axis direction. Considering such coordinate system, it is easy for the selected part identification unit 111 to indicate the click position using the coordinate (x, y). The coordinate indicating the click position is relative, changing according to a size of the content display area 301. Therefore, the selected part identification unit 111 preferably indicates the click position as a relative coordinate, for example, using a size of the content display area 301 (for example, a maximum value for the width direction Xmax and a maximum value for the height direction Ymax, or the like).

Moreover, the selected part identification unit 111 can acquire the elapsed time (for example, 1 min 25 sec in FIG. 3A) at a time of the click operation by inquiring to the content display unit 105.

Thus, the selected part identification unit 111 notifies the content execution unit 103 of the specified display position and the temporal position.

When the selected part identification unit 111 notifies of a display subject specifying information for specifying the display subject (that is, the display position and the temporal position), the content display unit 105 determines that the display subject of the movie content specified by such display subject specifying information has been selected. The content display unit 105 refers to metadata of the movie content currently reproducing, and specifies a content ID uniquely assigned to the movie content. After that, the additional information display unit 107 generates a request message, as shown in FIG. 5A for example, using the content ID and the display subject specifying information which the content display unit 105 has specified, and notifies the content providing server 3, that is a source of providing the movie content, of the generated request message via the communication unit 113.

The content providing server 3 controls a database which describes information related to the set bookmarks. In this database, as shown in FIG. 6 for example, it is described a content ID, a temporal position and a display position (point) that are added with a comment, a corresponding thumbnail image, a user ID to specify a user who added the comment, and a comment subject. If the content providing server 3 refers to the obtained request message and acquires the corresponding time of the corresponding content, the content providing server 3 determines whether there is a comment by referring to the database. If there is a comment, the content providing server 3 generates a response message as shown in FIG. 5B using several pieces of thumbnail images around the elapsed time and information regarding the comment subject as shown in FIG. 6. In this response message, as shown in FIG. 5B, the thumbnail images (five pieces of images in FIG. 5B) around the corresponding time including the one at the exact time (that is, the time described in Elapsed), and information related to the comment are described. In the information related to the comment, as shown in FIG. 5B for example, a time added with a comment, a comment subject, a position where the comment was added to, and a user ID of whom added the comment. The content providing server 3 transmits the generated response message to the information processing apparatus 10 that has transmitted the request message.

When obtained the response message transmitted from the content providing server 3, the content obtaining unit 101 of the information processing apparatus 10 transmits the obtained response message to the additional information display unit 107 of the content execution unit 103. The additional information display unit 107 refers to the obtained response message, and generates a thumbnail image display area 305 and a comment display area 307 as shown in FIG. 3B for example. After that, the additional information display unit 107 displays the obtained thumbnail image in the thumbnail image display area 305 in chronological order, and displays a comment included in each thumbnail image in the comment display area 307 as well. The additional information display unit 107 generates a balloon 309, as shown in FIG. 3B, into the comment display area 307, and displays a comment subject described in the obtained response message into the balloon 309.

Note that in FIG. 3B five pieces of images in total are displayed centering the time of the click operation as the thumbnail images, however, the number of pieces of thumbnail images to be displayed in the thumbnail image display area 305 is not limited to the above number of pieces, and an arbitrary number of pieces is to be displayed in accordance with the size of the display screen, the usable resources in the information processing apparatus 10, or the like.

On the other hand, if the thumbnail image display area 305 and the comment display area 307 are generated, the bookmark setting unit 109 refers to the display subject specifying information and generates the balloon 311 for writing a comment to the thumbnail image corresponding to the temporal position and the display position. This enables a user to be able to write an arbitrary comment to the selected display subject. Once a comment is input, the bookmark setting unit 109 determines the subject of the comment (that leads to determine a bookmark), or an object 313 such as a button or the like for confirming the subject of the comment. If the user operates an input device such as a mouse or the like to click the object 313, the subject of the bookmark is determined, and the bookmark setting unit 109 notifies the content providing server 3 of information related to the newly set bookmark. The information related to the bookmark which is notified to the content providing server 3 is, for example, information including the subject described in the database as shown in FIG. 6.

As is evident in the above explanation, the bookmark setting method according to the embodiment specifies the display subject that is selected by a user, and sets a bookmark, not to this display subject, but by specifying the display position (coordinate) and the temporal position (for example, the elapsed time) in which the selected display subject is described. Since such bookmark setting processing is performed, the user of the information processing apparatus 10 can easily set a bookmark including a comment to the display subject itself of movie content.

Note that the thumbnail image display area 305 and the comment display area 307 which are generated by the additional information display unit 107 can be operated separately from the content display area 301. Therefore, the user can change the subject displayed in the thumbnail image display area 305 and the comment display area 307 regardless of the subject displayed in the content display area 301.

For example, it is assumed that a user operates an input device such as a mouse or the like to perform a drag operation to the thumbnail image display area 305, and moves the thumbnail image that is displayed in downward direction. In this case, the additional information display unit 107 generates a request message related to a thumbnail image that is not obtained, and obtains differential thumbnail images from the content providing server 3. As a result, the thumbnail images displayed from 1 min 23 sec to 1 min 27 sec in FIG. 3B can be changed independently to the thumbnail images from 1 min 21 sec to 1 min 25 sec as shown in FIG. 3C.

Using such function, the bookmark setting unit 109 can provide a function for adjusting bookmark to be set to users of information processing apparatus 10. For example as shown in FIG. 3C, a user operates the balloon 311 so as to move a position (including both of a temporal position and a display position) of a bookmark which the user once tried to set for an image at 1 min 25 sec, within the thumbnail image display area 305 and the comment display area 307. The bookmark setting unit 109 redisplays the bookmark position at a position described in the display subject specifying information, referring to the display subject specifying information in the thumbnail image display area 305 notified by the selected position specifying unit 111. By such an operation, the user can move a bookmark desired to be set to a desired position for an image at 1 min 21 sec, for example.

During a processing of adjusting such a bookmark, various message as shown in FIGS. 5A and 5B are also exchanged between the content providing server 3 and the information processing apparatus 10.

By repeating such processing, the user can set exactly a position (a display position and a temporal position) for setting a bookmark.

Note that during a processing of setting such a bookmark, the content display unit 105 may continue to reproduce movie content that is currently displayed in the content display area 301, and may suspend reproducing of the movie content.

[Flow of Bookmark Setting Method]

Next, referring to FIG. 7 and FIG. 8, a detail explanation will be given on a flow of bookmark setting method according to the present embodiment.

Firstly, referring to FIG. 7, a flow of bookmark setting method will be described focusing on processing performed in the information processing apparatus 10.

In the information processing apparatus 10 according to the present embodiment, when a user performs an operation to start reproducing certain movie content, the content obtaining unit 101 starts obtaining corresponding content data from the content execution unit 103 (step S101). The content obtaining unit 101 transmits the obtained content data and metadata or the like to the content execution unit 103.

The content display unit 105 of the content execution unit 103 starts reproducing the movie content specified by the user, using the content data transmitted from the content obtaining unit 101 (step 103). This enables a screen for reproducing the movie content to be displayed on the display screen of the information processing apparatus 10.

Here, the content execution unit 103 determines whether the reproducing of the content has been ended (step S105). If the reproducing of the content ended, the content execution unit 103 ends processing of reproducing the content.

On the other hand, if the reproducing of the content has not been ended, the content execution unit 103 determines whether the user performs an operation of selecting the display subject (step S107). If the operation of selecting has not been performed yet, the content execution unit 103 returns to step S105 and continues reproducing the content.

Further, if the user performs the operation of selecting the display subject, the selected part identification unit 111 notifies the content execution unit 103 of the display subject specifying information, and the additional information display unit 107 of the content execution unit 103 generates a request message as shown in FIG. 5A for example, and obtains an additional information including the thumbnail images around the scene selected by the content providing server 3. After that, the additional information display unit 107 displays the thumbnail images around the selected scene in the thumbnail image display area 305 based on the obtained additional information (step S109). Note that if the obtained additional information describes information related to a bookmark including a comment, the additional information display unit 107 displays a comment corresponding to the comment display area 307.

After that, the bookmark setting unit 109 of the content execution unit 103 generates a balloon for writing a comment based on the display subject specifying information notified by the selected part identification unit 111, and waits for an input of comment by a user. Further, the bookmark setting unit 109 adjusts a bookmark point (a position to set a bookmark) as described above according to the user operation (step S111).

Further, if a subject of a bookmark to be set by a user operation, the bookmark setting unit 109 generates information related to the newly set bookmark to fix the bookmark (step S113), and notifies the content providing server 3 of the subject of the bookmark.

Subsequently, referring to FIG. 8, a flow of bookmark setting method will be described focusing on information exchanging between the content providing server 3 and the information processing apparatus 10.

In the information processing apparatus 10 according to the present embodiment, when a user performs an operation to start reproducing certain movie content, the content obtaining unit 101 starts obtaining corresponding content data from the content execution unit 103 (step S201). At this time, the content obtaining unit 101 uses content ID or the like uniquely associated to the movie content specified by the user, generates a viewing start request to obtain content data and transmits to the content providing server 3 via the communication unit 113.

When received the viewing start request, the content providing server 3 specifies movie content to be distributed based on information described in the request, and starts distributing content (step S203). This enables the distribution of the content data to be started from the content providing server 3 to the information processing apparatus 10.

When receiving the content data, the content obtaining unit 101 of the information processing apparatus 10 transmits the received content data to the content execution unit 103. The content display unit 105 of the content execution unit 103 starts reproducing of the movie content using the obtained content data (step S205).

Moreover, if the display subject is selected by the user and the processing of setting a bookmark started (step S207), the additional information display unit 107 generates a request message including a content ID, a time and point selected by the user. After that, the additional information display unit 107 transmits the generated request message to the content providing server 3 via the communication unit 113.

The content providing server 3 that has received the request message refers to the managed database or the like based on a subject of the received request message, and generates a response message including additional information such as the corresponding thumbnail image and comment or the like. After that, the content providing server 3 distributes the additional information by transmitting the response message to the information processing apparatus 10 (step S209).

When obtained the response message including the additional information, the content obtaining unit 101 of the information processing apparatus 10 transmits the obtained additional information to the additional information display unit 107. The additional information display unit 107 displays a thumbnail and a comment based on the obtained additional information (step S211).

If the user performs processing of adjusting a bookmark as described above (step S213), the bookmark setting unit 109 generates a content ID, and a message including the adjusted time and point selected by the user. After that, the bookmark setting unit 109 transmits the generated message to the content providing server 3 via the communication unit 113.

The content providing server 3 refers to the received message and determines whether new additional information exists, and if there is the new additional information, the content providing server 3 distributes the additional information to the information processing apparatus 10 (step S215). This enables the information processing apparatus 10 to update the display screen based on the new additional information.

If the bookmark has been fixed after such interactions (step S217), the bookmark setting unit 109 generates information related to the newly set bookmark. The information includes a content ID, and information related to the setting time, setting point and a subject of a comment. After that, the bookmark setting unit 109 transmits the generated information to the content providing server 3 via the communication unit 113.

The content providing server 3 refers to the information related to the bookmark that is set, stores the newly set bookmark (step S219), and the new bookmark is to be shared among viewers of the content.

By performing the processing in the flow as described above, the user can easily set a bookmark to a scene of an object of movie content while viewing the movie content.

MODIFIED EXAMPLES

Modified example 1

Figure 9:
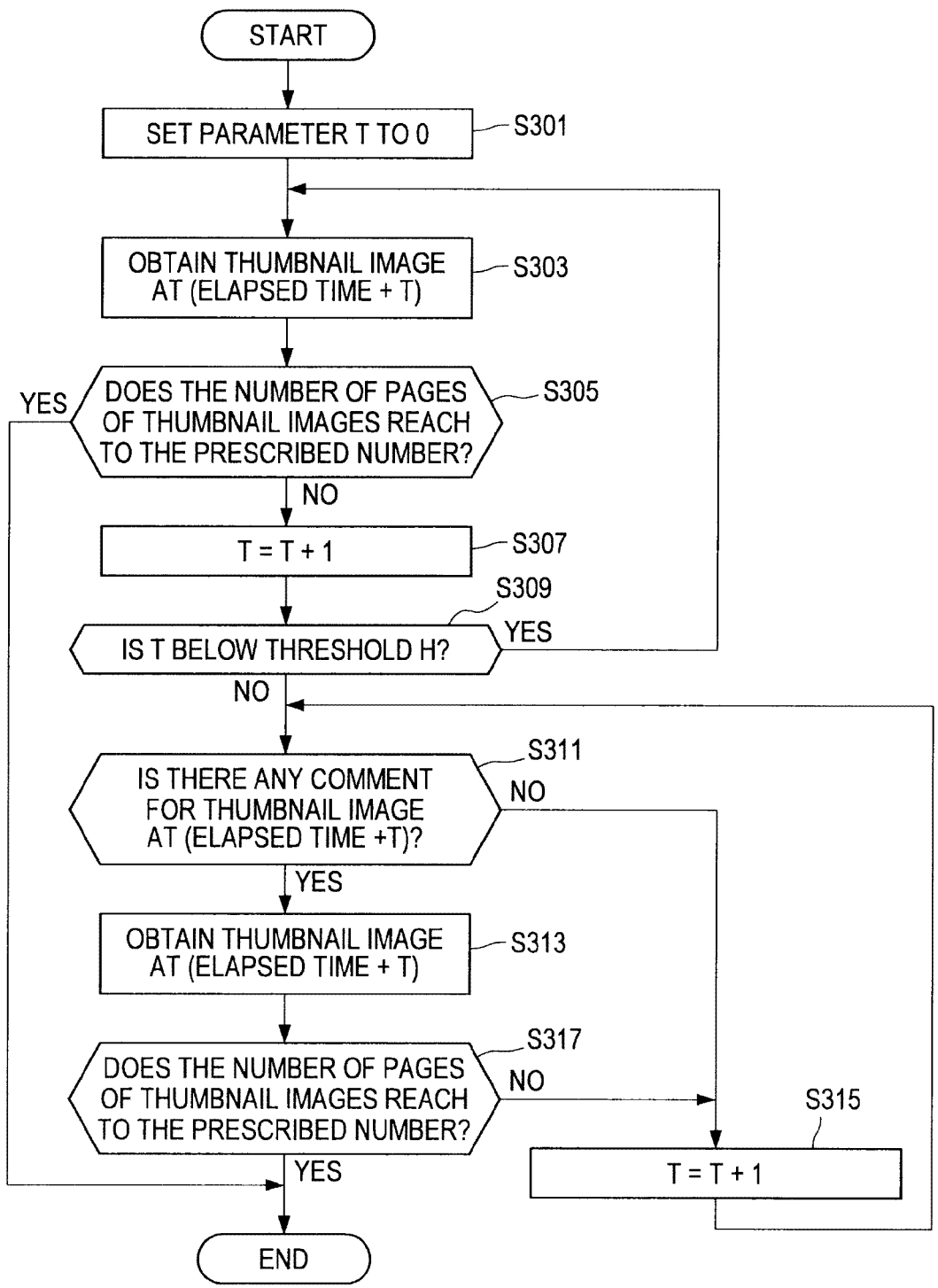
FIG. 9 is a flow chart for illustrating a modified example of the bookmark setting method according to the embodiment.
Figure 10:
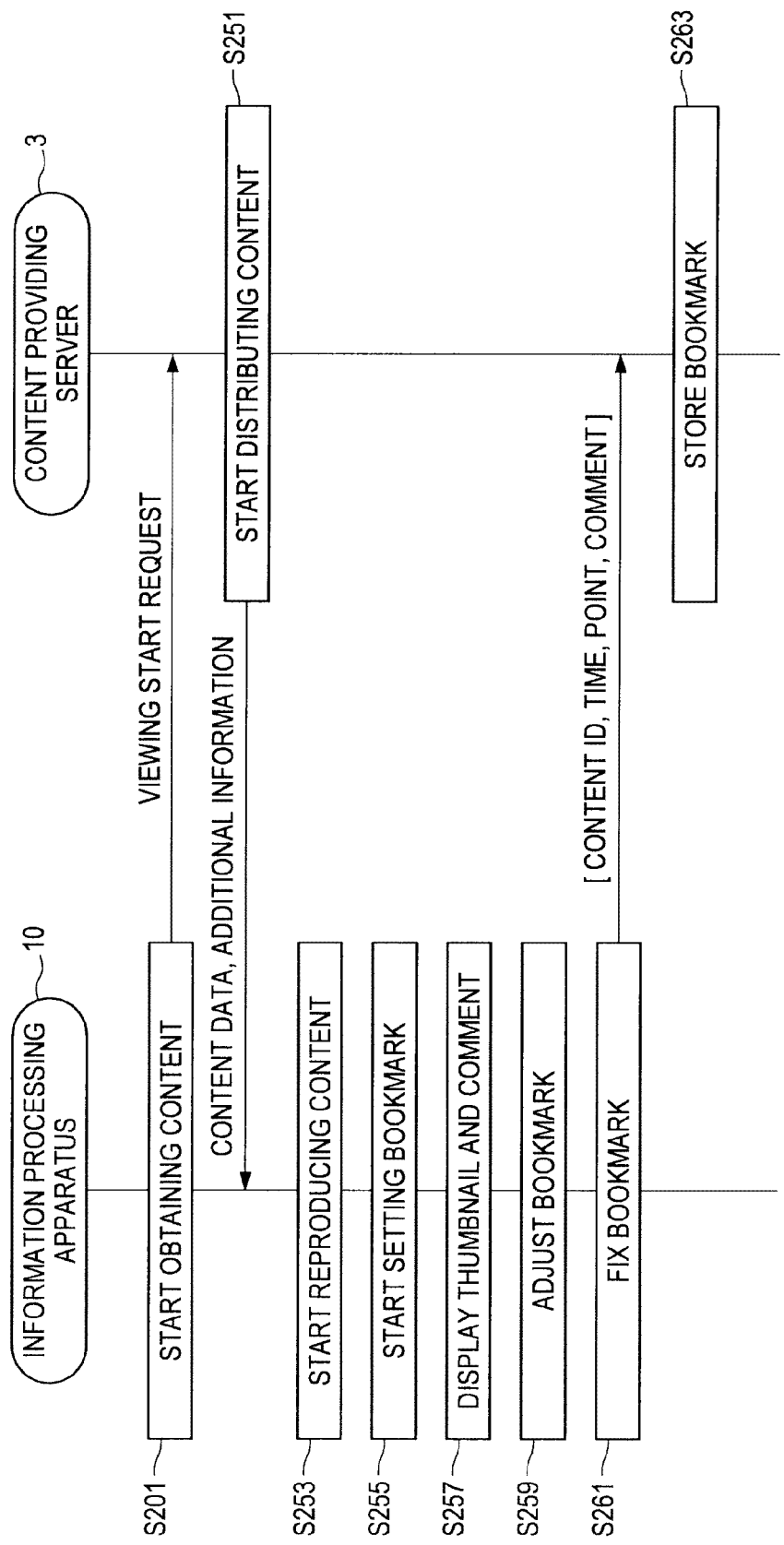
FIG. 10 is a flow chart for illustrating a modified example of the bookmark setting method according to the embodiment.

Subsequently, referring to FIG. 9 and FIG. 10, an explanation will be given on modified examples of the information processing apparatus 10 and the bookmark setting method according to the present embodiment. FIG. 9 and FIG. 10 are flow charts for illustrating a modified example of the bookmark setting method according to the present embodiment.

In the first embodiment explained above, the content providing server 3 distributed a plurality (for example, five pieces) of thumbnail images in consecutive time only to the information processing apparatus 10. However, the information processing apparatus 10 may display more number of pieces of thumbnail images in the thumbnail image display area 305, and may omit displaying thumbnail images without a comment. For example, the additional information display unit 107 may perform a display method to perform displaying a total of five pieces thumbnail images only which are at more than 2 seconds before and after and which are with comments after displaying the current elapsed time and thumbnail images at one second before and after.

FIG. 9 is a processing flow in a case where the number of pieces of thumbnail images at the side of the content providing server 3. For convenient sake, FIG. 9 limited to a case where thumbnail images only after the elapsed time are provided, however, it can also perform the same to the thumbnail images before the elapsed time as well. Following to this flow, the information processing apparatus 10 displays thumbnail images only with a comment, however, if the image is within H seconds before and after the current elapsed time, all the thumbnail images are to be displayed. Moreover, if the number of pieces of thumbnail images reaches to the prescribed number, the content providing server 3 ends providing the thumbnail images. Here, the prescribed number can be set, for example, as "five pieces", and can be flexibly set according to the size of the thumbnail image display area 305.

Hereinafter, an explanation will be given step by step.

Firstly, the content providing server 3 set 0 to a value of parameter T used for processing of obtaining thumbnail images (step S301). Next, the content providing server 3 obtains a thumbnail image at a time of (the elapsed time+T) from the prescribed stored place (step S303). After that, the content providing server 3 determines whether the number of pieces of thumbnail images has reached to the prescribed number (step S305). If the number of pieces of thumbnail images has reached to the prescribed number, the content providing server 3 ends the processing of obtaining the thumbnail images.

On the other hand, if the number of pieces of thumbnail images has not reached to the prescribed number, the content providing server 3 increases a value of the parameter by 1 (step S307), and determines whether the new value for T is below than the prescribed threshold H (step S309). If the value of T is below than the threshold H, the content providing server 3 returns to step S303 and continues the processing.

Further, if the new value of T exceeds the threshold H, the content providing server 3 determines whether the thumbnail image at a time of (the elapsed time+H) is added with a comment (step S311). Such determination can be performed by referring to a bookmark management table shown in FIG. 6. If a comment is added, the content providing server 3 obtains thumbnail images at a time of (the elapsed time+T) (step S313). Moreover, if a comment is not added, the content providing server 3 increases the value of parameter T by 1 (step S315), and returns to step S311 to continue the processing.

Further, if obtained the thumbnail image at a time of (the elapsed time+H) in step S313, the content providing server 3 determines whether the number of pieces of thumbnail images has reached to the prescribed number (step S317). If the number of pieces of thumbnail images has reached to the prescribed number, the content providing server 3 ends the processing of obtaining thumbnail images. Further, if the number of pieces of thumbnail images has not reached to the prescribed number yet, the content providing server 3 returns to step S315 to continue the processing.

Note that the processing of selecting such thumbnail images may be performed in the information processing apparatus 10 which obtains all the thumbnail images in advance from the content providing server 3.

Modified Example 2

In the first embodiment explained above, an explanation has been given on a case where the information processing apparatus 10 sets a bookmark while communicating with the content providing server 3. However, the information processing apparatus 10 can obtain all the additional information from the content providing server 3 at the same time of distributing movie contents, and perform a bookmark setting in the side of the information processing apparatus 10 without communicating with the content providing server 3.

Hereinafter, an explanation will be given step by step.

In the information processing apparatus 10 according to the present modified example, when a user performs an operation to start reproducing certain movie content, the content obtaining unit 101 starts obtaining corresponding content data from the content execution unit 103 (step S201). At this time, the content obtaining unit 101 uses content ID or the like uniquely associated to the movie content specified by the user, generates a viewing start request to obtain content data and transmits to the content providing server 3 via the communication unit 113.

When receiving the viewing start request, the content providing server 3 specifies movie content to be distributed based on information described in the request, and starts distributing content (step S251). This enables the distribution of the content data and the additional information to be started from the content providing server 3 to the information processing apparatus 10.

When received the content data and the additional information, the content obtaining unit 101 of the information processing apparatus 10 transmits the received content data and additional information to the content execution unit 103. The content display unit 105 of the content execution unit 103 starts reproducing of the movie content using the obtained content data (step S253).

Moreover, if the display subject is selected by the user and the processing of setting a bookmark started (step S253), the additional information display unit 107 displays a thumbnail image and a comment based on the additional information transmitted from the content obtaining unit 101 (step S257).

If the user performs a processing of adjusting a bookmark as described above (step S259), the bookmark setting unit 109 stores the adjusted time and point selected by the user.

If the bookmark has been fixed after such processing of adjusting (step S261), the bookmark setting unit 109 generates information related to the newly set bookmark. The information includes a content ID, and information related to the latest setting time, setting point and a subject of a comment. After that, the bookmark setting unit 109 transmits the generated information to the content providing server 3 via the communication unit 113.

The content providing server 3 refers to the information related to the bookmark that is set, stores the newly set bookmark (step S263), and the new bookmark is to be shared among viewers of the content.

By performing such processing of setting a bookmark, in the information processing apparatus 10 according to the present modified embodiment, it can be possible to eliminate the number of communication with the content providing server 3 to decrease the network resource.

Other Modified Examples

Moreover, other than the above-described modified example, there may be a modified example in which the information processing apparatus 10 dynamically generates a thumbnail image without obtaining a thumbnail image from the content providing server 3. Further, there may be another modified example in which transmission of points on bookmark setting/adjusting/determination is omitted, and only scenes with movie content (that is, the elapsed time only) are to be setted.

(Hardware Configuration)

Figure 11:
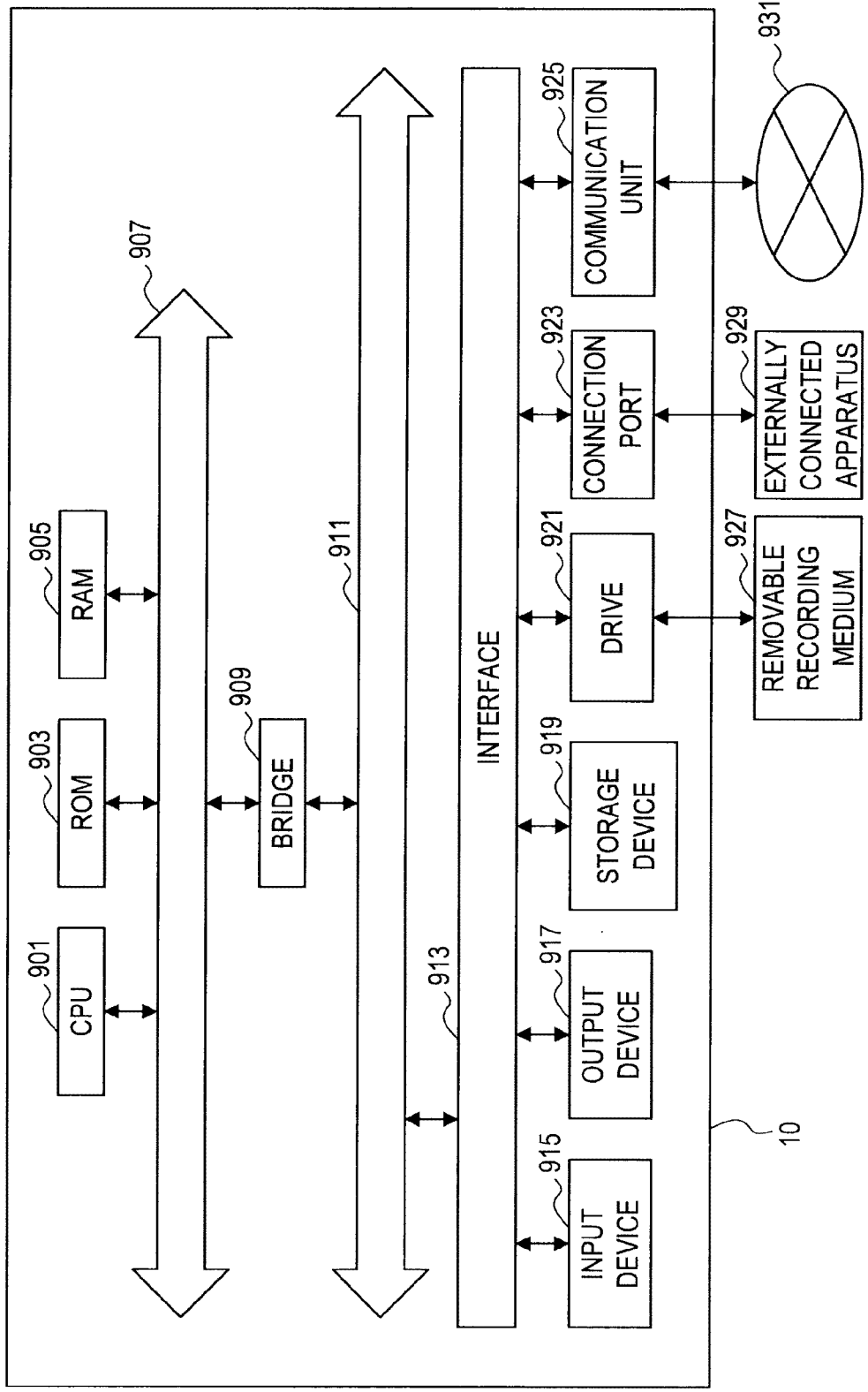
FIG. 11 is a block diagram for illustrating a hardware configuration of the information processing apparatus according to the embodiment.

Next, the hardware configuration of the information processing apparatus 10 according to the embodiment of the present invention will be described in detail with reference to FIG. 11. FIG. 11 is a block diagram for illustrating the hardware configuration of the information processing apparatus 10 according to the embodiment of the present invention.

The information processing apparatus 10 mainly includes a CPU 901, a ROM 903, and a RAM 905. Furthermore, the information processing apparatus 10 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and a control device, and controls the overall operation or a part of the operation of the information processing apparatus 10 according to various programs recorded in the ROM 903, the RAM 905, the storage device 919, or a removable recording medium 927. The ROM 903 stores programs, operation parameters, and the like used by the CPU 901. The RAM 905 primarily stores programs used in execution of the CPU 901 and parameters and the like varying as appropriate during the execution. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected device 929 such as a mobile phone or a PDA conforming to the operation of the information processing apparatus 10. Furthermore, the input device 915 generates an input signal based on, for example, information which is input by a user with the above operation means, and is configured from an input control circuit for outputting the input signal to the CPU 901. The user of the information processing apparatus 10 can input various data to the information processing apparatus 10 and can instruct the information processing apparatus 10 to perform processing by operating this input apparatus 915.

The output device 917 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processing performed by the information processing apparatus 10. More specifically, the display device displays, in the form of texts or images, a result obtained by various processes performed by the information processing apparatus 10. On the other hand, the audio output device converts an audio signal such as reproduced audio data and sound data into an analog signal, and outputs the analog signal.

The storage device 919 is a device for storing data configured as an example of a storage unit of the information processing apparatus 10 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and various data obtained from the outside.

The drive 921 is a reader/writer for recording medium, and is embedded in the information processing apparatus 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing apparatus 10. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the information processing apparatus 10 directly obtains various data from the externally connected apparatus 929 and provides various data to the externally connected apparatus 929.

The communication device 925 is a communication interface configured from, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wireless sly, and may be, for example, the Internet, a home LAN, infrared communication, radio wave communication, satellite communication, or the like.

Heretofore, an example of the hardware configuration capable of realizing the functions of the information processing apparatus 10 according to the embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

(Summary)

As described above, the information processing apparatus and the bookmark setting method according to the embodiments of the present invention enable a user to set easily a bookmark to a scene and an object while viewing movie content.

A bookmark setting during viewing of movie content may disturb a viewing act. However, by displaying thumbnail for setting a bookmark as the present embodiment, the user can carefully adjust a scene or an object to be set with a bookmark without disturbing a progress of a movie player.

Further, although movie content may include a lot of similar scenes and a lot of users may intend to bookmark the same object, it is not easy to collect the comments on the same object of the exactly same scene. However, according to the embodiment of the present invention, if some comments have already existed in the similar objects around the scene when adjusting a bookmark point, a user can adjust a position of the bookmark intentionally to aggregate own comment to the comment around. This may bring an effect of tagging by collective intelligence on a scene or an object.

Moreover, according to the embodiment, a comment can be added to a scene or an object in the movie content, therefore, it can be possible to display a comment following the moves of the object combining an object recognition technology or the like, and to embed a comment into the movie player.

Further, if bookmarks flock to a certain scene in movie content, by setting the specific part as a "popular point" of the movie content, the information processing apparatus can extract only the scenes that have been popular to provide to users.

A preferred embodiment of the present invention has been explained in detail above with reference to the attached drawings, the present invention is not limited to this example. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-264820 filed in the Japan Patent Office on Nov. 20, 2009, the entire content of which is hereby incorporated by reference.

What is claimed is:

1. An information processing apparatus comprising:
   a content display unit configured to display movie content on a display screen; and
   a bookmark setting unit configured to set a bookmark, in which a display position where a display subject is displayed on the display screen and a temporal position within the movie content where the display subject is displayed on the display screen are mutually related to each other, to the display subject of the movie content displayed on the display screen by the content display unit;
wherein the bookmark setting unit can set the bookmark without temporally disturbing a progress of playing movie content by the content display unit.

2. The information processing apparatus according to claim 1, wherein
the bookmark further includes an arbitrary comment to the display subject specified by a user operation.

3. The information processing apparatus according to claim 2, wherein
the information processing apparatus further includes an additional information display unit configured to display additional information including the bookmark that has been already related to the movie content, and
the additional information display unit is configured to display a number of pieces of thumbnail images in a prescribed area within the display screen if the display subject displayed on the display screen is selected by a user operation.

4. The information processing apparatus according to claim 3, wherein
the additional information display unit refers to the temporal position of the selected display subject and displays the thumbnail image at the temporal position and another thumbnail image temporally positioned adjacent to the thumbnail image.

5. The information processing apparatus according to claim 4, wherein
the additional information display unit displays a thumbnail image corresponding to the temporal position that has been already set with the bookmark within the prescribed area.

6. The information processing apparatus according to claim 3, wherein
the bookmark setting unit further relates a display position of the display subject on a thumbnail image displayed in the prescribed area selected by a user operation and a temporal position of the thumbnail image to each other to set as a bookmark.

7. The information processing apparatus according to claim 1, wherein
the information processing apparatus further includes a selected position specifying unit configured to specify a position of a user operation performed to the display screen, and
the selected position specifying unit specifies a relative coordinate indicating a position selected by a user operation in accordance with a size of the display screen, and specifies a temporal position in the movie content of the display subject based on a temporal position related to image data that configures the movie content and that includes a selected display subject.

8. The information processing apparatus according to claim 1, wherein
the information processing apparatus further includes a communication unit for transmitting the bookmark set by the bookmark setting unit to a device externally equipped.

9. A bookmark setting method comprising:
displaying video content on a display screen;
specifying, based on a user operation performed to a display subject of the movie content displayed on the display screen, a display position where the display subject is displayed on the display screen and a temporal position within the movie content where the display subject is displayed on the display screen; and
relating the specified display position and temporal position to each other to set a bookmark to the display subject,
wherein specifying the display position and the temporal position can be performed without temporally disturbing a progress of playing video content on the display screen.

10. At least one computer-readable storage device storing computer-executable instructions that, when executed by at least one processor, cause a computer to execute a method comprising:
displaying movie content on a display screen; and
setting a bookmark, in which a display position where a display subject is displayed on the display screen and a temporal position within the movie content where the display subject is displayed on the display screen are mutually related to each other and are set as a bookmark, to the display subject of the movie content displayed on the display screen by a content display unit;
wherein setting the bookmark can be performed without temporally disturbing a progress of playing movie content on the display screen.

11. The information processing apparatus according to claim 3, wherein:
the prescribed area displaying the pieces of thumbnail images can be operated independently from the content display area.

12. The bookmark setting method of claim 9, wherein:
the display position and the temporal position can be changed by moving a position of an indicator within a thumbnail image display area.

13. The at least one computer-readable storage device according to claim 10, wherein:
during a processing of setting the bookmark, the progress of playing movie content on the display screen can continue without being paused.

14. The information processing apparatus according to claim 3, wherein the prescribed area comprises a thumbnail image display area and a comment display area, and the bookmark setting unit is configured to set the bookmark by setting a comment in the comment display area to correspond with a thumbnail in the thumbnail image display area.

* * * * *